United States Patent [19]
Chamberlin et al.

[11] Patent Number: 4,879,621
[45] Date of Patent: Nov. 7, 1989

[54] DISK RESTRAINT

[75] Inventors: Davis W. Chamberlin, St. Paul; Vurnen J. Leonard, Minneapolis, both of Minn.; Osamu Koizumi, Sendai, Japan

[73] Assignees: Minnesota Mining and Manufacturing Company, St. Paul, Minn.; Sony Corporation, Tokyo, Japan

[21] Appl. No.: 217,439

[22] Filed: Jul. 11, 1988

[51] Int. Cl.$^4$ .............................................. G11B 23/03
[52] U.S. Cl. .................................................... 360/133
[58] Field of Search .......................................... 360/133

[56] References Cited
U.S. PATENT DOCUMENTS

| | | | |
|---|---|---|---|
| 4,490,764 | 12/1984 | Butz | 360/133 |
| 4,571,718 | 2/1986 | Cahill et al. | 360/133 |
| 4,799,123 | 1/1989 | Kanazawa et al. | 360/133 |
| 4,819,114 | 4/1989 | Bernitt et al. | 360/133 |

Primary Examiner—Robert S. Tupper
Attorney, Agent, or Firm—Donald M. Sell; Walter N. Kirn; David W. Anderson

[57] ABSTRACT

A cartridge enclosing a disk-shaped magnetic recording medium is provided with a disk restraint disposed between the disk and the cartridge for sliding movement in the plane of the disk. A camming surface is provided on the cartridge which forces the restraint downwardly to restrain the disk when the cartridge is not in use. In use, the restraint is slid out of engagement with the camming surface to release the recording disk.

13 Claims, 9 Drawing Sheets

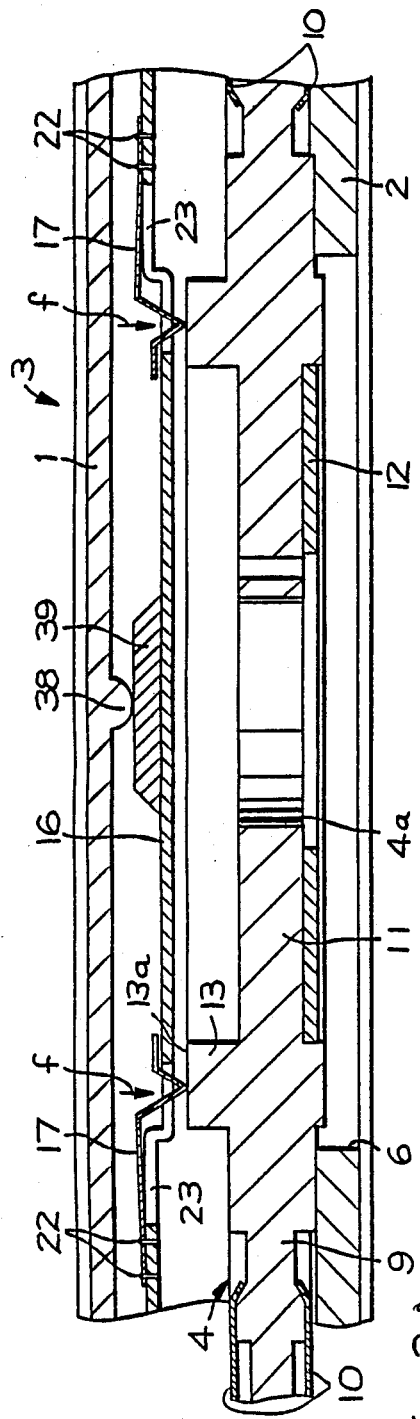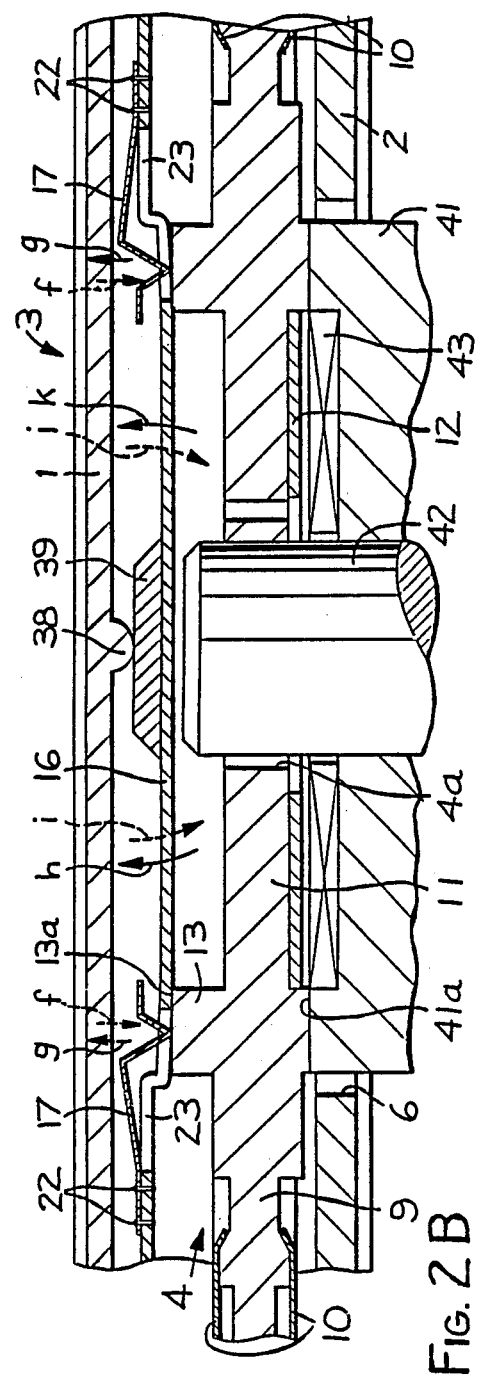

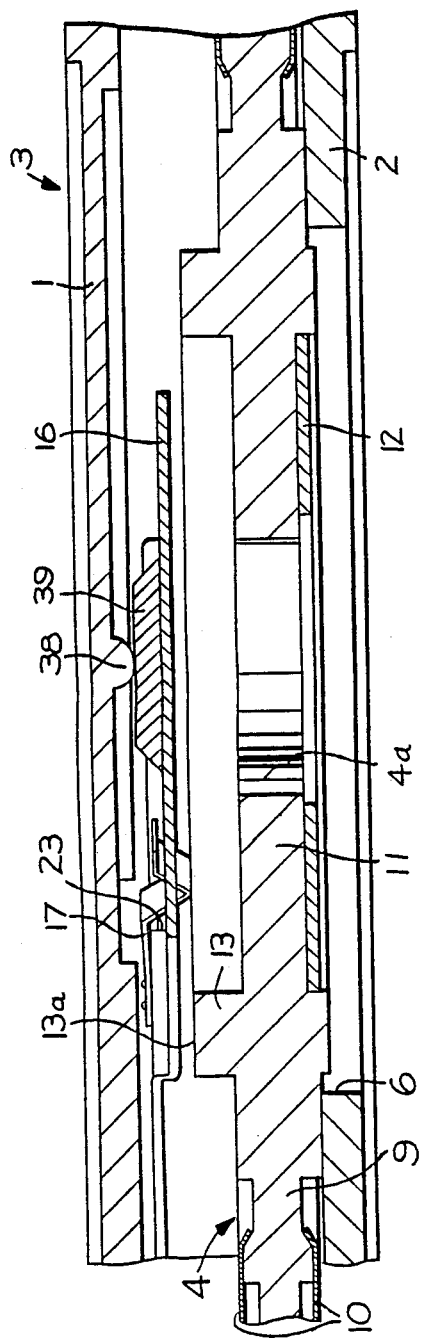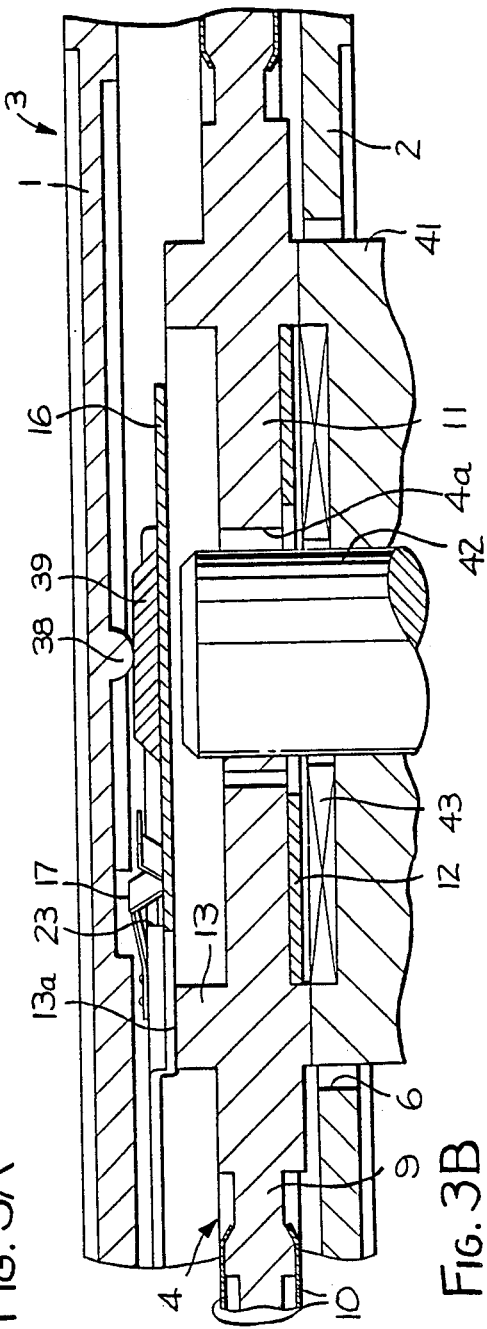

DISK RESTRAINT

BACKGROUND OF THE INVENTION

1. Field of the Invention

This invention relates to a disk cartridge adapted to enclose a disk-like magnetic recording medium, and particularly a disk locking member provided within the cartridge to restrain the disk when the cartridge is not in use.

2. Description of the Prior Art

According to an invention which has been filed under Japanese Utility Model Registration Application No. 61-126238, the core of a disk-like recording medium enclosed within a disk cartridge is pressed from above by a disk locking member which is pressed downward by a compression spring, so as to lock the recording medium in a case of the cartridge when the recording medium is not in use. When the recording medium is in use, the recording medium is secured to the table of a recording apparatus by the force of the compression spring as the table contacts the core and the disk locking member, and as a result, the compression spring is compressed. After the recording medium is secured to the table, the disk locking member is raised by the attractive force of a magnet which is inserted in the case of the cartridge from above and then moved upwards, so as to have the disk locking member separated from the recording medium. Thus, the recording medium is unlocked.

In the above disk cartridge, the operation to lock or unlock the recording medium and to secure the recording medium to the table of the apparatus is performed surely and accurately.

However, in the above disk cartridge, the mechanism that unlocks the recording medium by the attractive force of the magnet that is moved up and down, is very complex. In addition, the compression spring which is compressed when the recording medium is secured, is compressed further when the recording medium is unlocked, so that a large force is necessary to unlock the recording medium.

SUMMARY OF THE INVENTION

The disk cartridge of this invention comprises an enclosure accommodating a disk-like recording medium, and having an upper half and a lower half; a table insertion opening in the lower half facing the core of the disk-like recording medium; a disk locking member arranged between the disk-like recording medium and the upper half, and movable in the plane of the disk between a restraint position where the core is forced downwardly from above, and a release position where the core is released; and guides provided in the case so as to guide the disk locking member as the disk locking member is moved from the restraint position to the release position.

In the disk cartridge of this invention, because the recording medium is unlocked by movement of the locking member in the plane of disk, it is possible to unlock the recording medium by the application of a very small force.

BRIEF DESCRIPTION OF THE DRAWINGS

The novel features and advantages of the present invention will become more apparent to those skilled in the art upon consideration of the following detailed description which refers to the accompanying drawings, wherein:

FIGS. 2A to 2C are cross-sectional views taken generally along the line II—II of FIG. 1A and illustrating successive positions during the operation of the disk restraint;

FIGS. 3A to 3C are cross-sectional views taken along the line III—III on FIG. 1A and illustrating successive positions during the operation of the disk restraint;

Figure 1A:
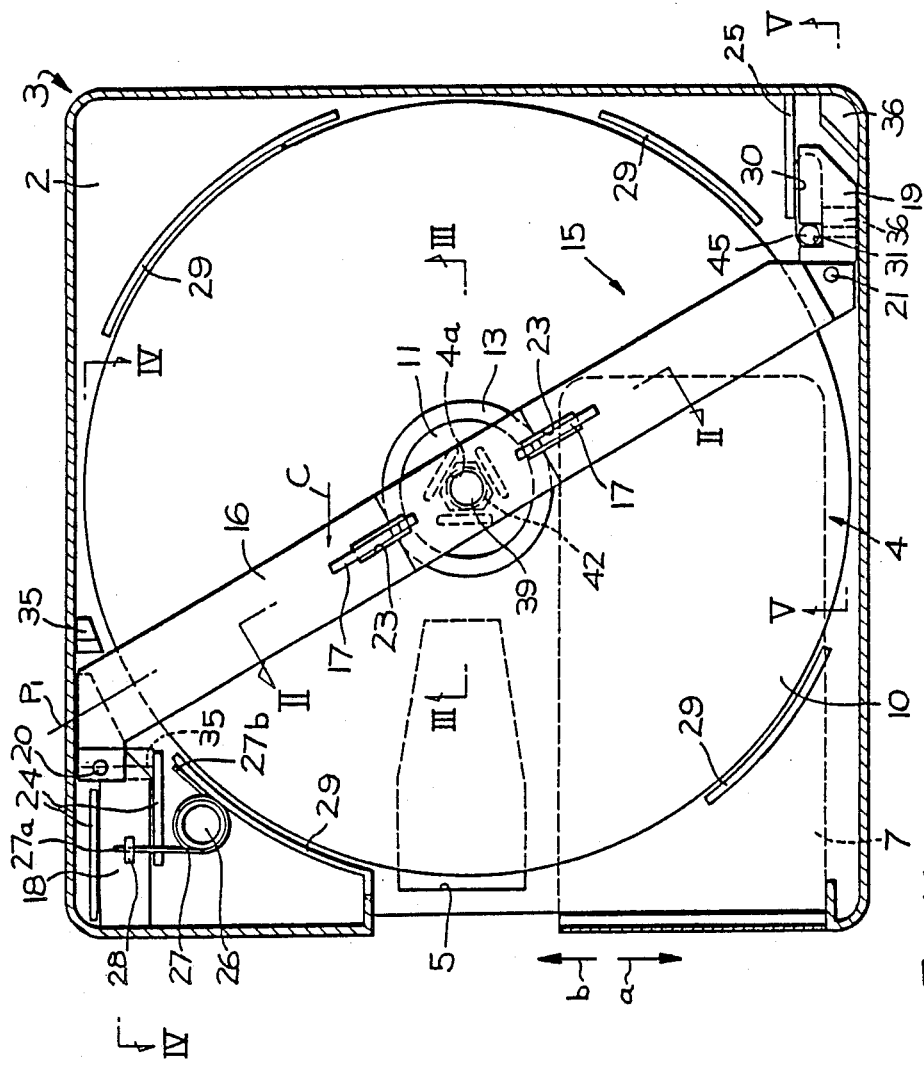
FIGS. 1A and 1B are plan views of the disk cartridge of the invention and a first embodiment of a disk restraint according to the invention with the upper half of the cartridge removed and the restraint shown in a disk-restraint position and a release position, respectively.

This disk cartridge accommodates a disk-like recording medium (hereinafter described simply as a disk) 4 in a freely rotatable manner in a case 3 comprised of an upper half 1 and a lower half 2 which are made of synthetic resin or the like. A pair of substantially rectangular upper and lower head insertion slots 5 are provided in the respective upper and lower halves 1 and 2. A table insertion opening 6 surrounding a center hole 4a which is the disk 4, is provided at substantially the center of the lower half 2. A shutter 7 in the form of a U-shape and made of a stainless-steel plate or synthetic resins is slideably secured to the case 3 to be movable in directions of arrows a and b in FIG. 1A. The pair of head insertion slots 5 and the table insertion opening 6 are simultaneously opened and closed by the shutter 7. The disk 4 called a stretched surface recording (SSR) disk and comprises a base plate 9 made of synthetic resin, light metal or the like, and a pair of magnetically-coated sheets 10 as recording media which are stretched over the respective upper and lower faces of the base plate 9. A core 11 with the center hole 4a forms the center portion of the base plate 9, and has a magnetic plate 12 made of stainless-steel or the like at the lower surface thereof. The magnetic plate 12 is attached to to the core 11 when the base plate 9 is molded, preferably with an adhesive. An annular rib 13 is integrally formed on the upper surface of the core 11 coaxially with the center hole 4a.

Figure 1B:
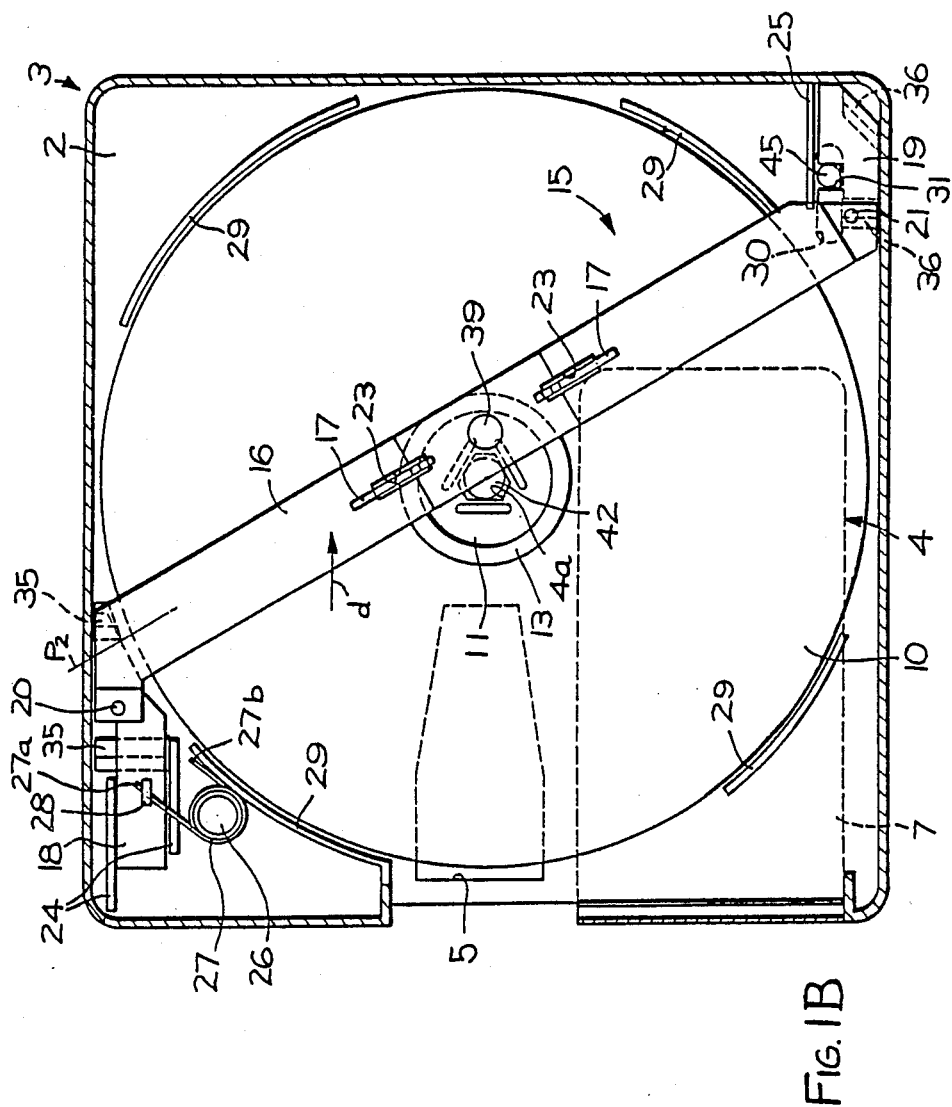

A disk locking member 15 disposed between the disk 4 and the upper half 1, comprises a first elastic member 16 which is slideable in the directions of arrows c and d between a restraint position $P_1$ shown in FIG. 1A and a release position $P_2$ which is laterally spaced from the restraint position $P_1$ as shown in FIG. 1B. The core 11 being elastically pressed from above in the restraint position $P_1$ and released in the release position $P_2$. A pair of second elastic members 17 are supported by the first member 16, and resiliently contact two positions, which form an angle of 180° with each other, on the upper surface 13a of the annular rib 13. The first member 16 is, for example, a wide and long leaf spring having a high spring constant. The second elastic member 17 is, for example, a narrow and short leaf spring having a low spring constant.

The first elastic member 16 is horizontally arranged along a diagonal of the case 3. The two ends of the first member 16 are secured to a pair of sliders 18 and 19. The pair of sliders 18 and 19 are placed at the inner corner portion of the case 3, are made of synthetic resin or the like, and are attached to the ends of the first-member 16 pins 20 and 21. The pair of second elastic members 17 are attached to the first elastic member 16 with pins 22, and project downward through a pair of slots 23 provided in the first elastic member 16. The sliders 18 and 19 are guided by respective guides walls 24 and 25 projected from the lower half 2, so as to be moved toward front and rear of the case, that is, in the direction of arrows c and d.

A torsion spring 27 surrounds a pin 26 which projects from the lower half 2 near the slider 18, and the ends 27a and 27b of the spring 27 engage a spring stop 28 provided in the slider 18, and a disk positioning projection 29 projected from the lower half 2, respectively. Thus, the first elastic member 16 is urged by the force of the spring 27 in the direction of arrow c through the slider 18. In the other slider 19, there is provided a pin insertion notch 31 which faces a pin insertion slot 30 provided in the lower half 2.

Figure 4A:
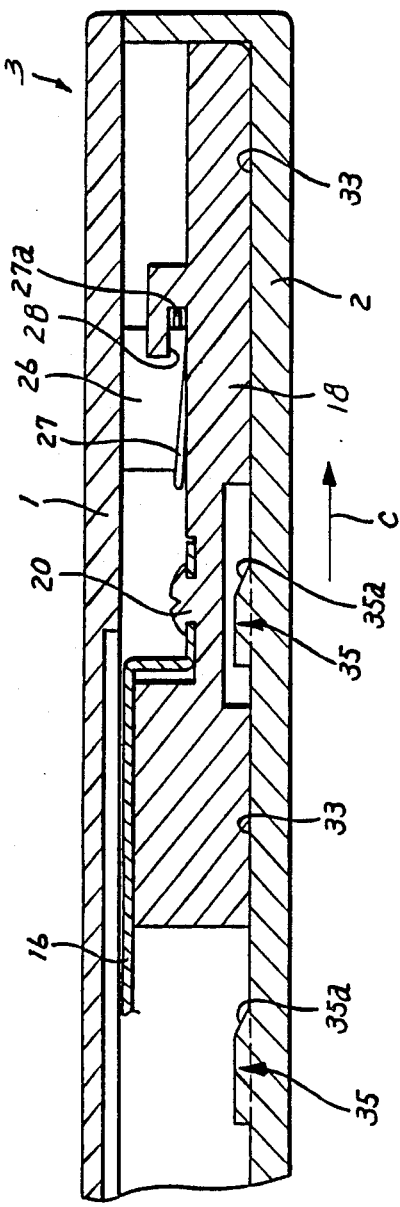
FIGS. 4A and 4B are sectional views taken along the line IV—IV on FIG. 1A and illustrating successive positions during the operation of the disk restraint.
Figure 4B:
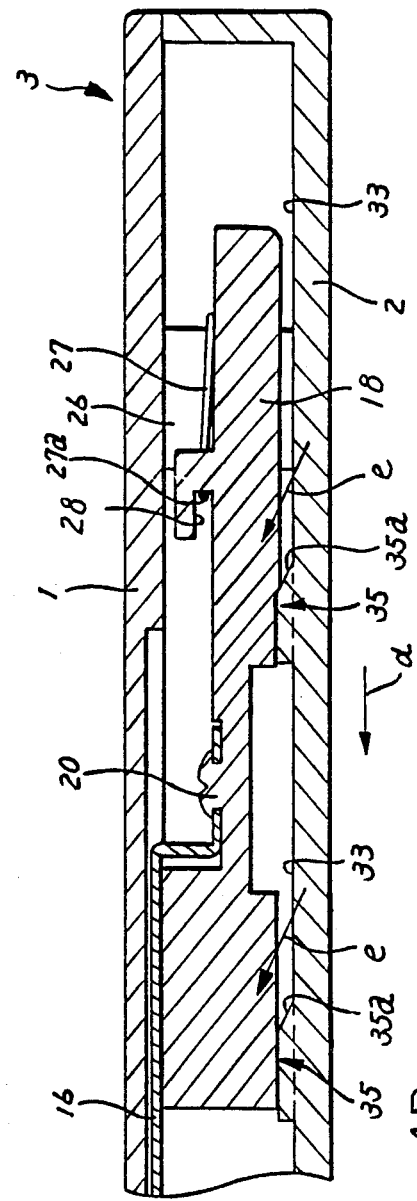
Figure 5A:
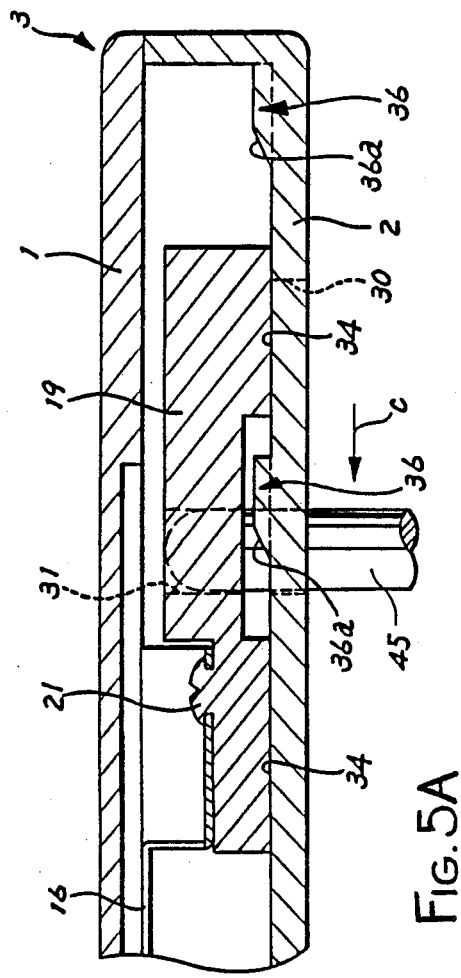
FIGS. 5A and 5B are sectional views taken along the line V—V on FIG. 1A and illustrating successive positions during the operation of the disk restraint.
Figure 5B:
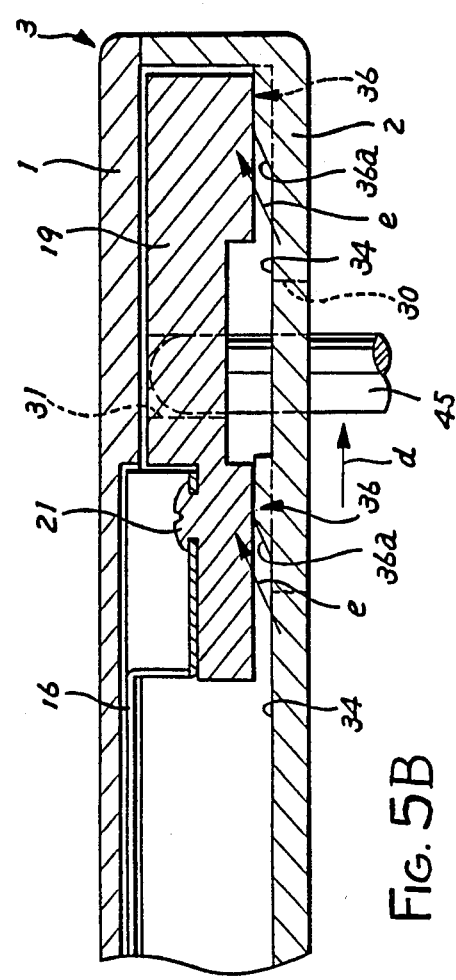

Projected from sliding faces 33 and 34 on which the respective slides 18 and 19 rest are guides 35 and 36 by which the disk locking member 15 is raised in an oblique direction with respect to the plane of the disk 4 (in a direction of arrow e in FIGS. 4B and 5B). The guides 35 and 36 have inclined surfaces 35a and 36a, respectively.

As seen in FIGS. 3A and 3B, a hemisphere-like projection 38 projects from the lower face of the upper half 1 so as to coincide with the center of the table insertion hole 6, and a wear-resisting low friction member 39 of a circular, truncated cone shape is fixed by adhesives or the like to the center portion of the first elastic member 16 to face the hemisphere-like projection 38.

Next, the function of the above disk cartridge will be hereinafter described.

When the disk cartridge is not in use, the first elastic member 16 is forced in the direction of arrow c by the torsion spring 27, and is located in the restraint position $P_1$ as shown in FIG. 1A, and the sliders 18 and 19 are located in the positions shown in FIGS. 4A and 5A. In the restraint position $P_1$, the first elastic member 16 is horizontal, and the second elastic members 17 are pressed against the top face 13a of the annular rib 13 of the core 11 due to the weak elastic force thereof which acts in the direction of arrow f. That is, the low friction member 39 is located just under the projection 38, and the disk 4 is pressed against the lower half 2 by the force of the second elastic member 17 which forces downwardly on the core 11, so that the disk 4 is protected from damage due to movement of the disk 4 within the case.

When the disk cartridge is in use and after the disk cartridge is inserted in a disk player and the shutter 7 is moved to the open position in the direction of arrow a in FIG. 1A, the disk 4 is horizontally held above a turntable 41 of the disk player at the core 11 thereof as shown in FIGS. 2B and 3B. At that time, the table 41 is inserted into the case 3 through the table insertion opening 6 from underneath, and a spindle 42 of the disk player is also inserted into the center hole 4a from underneath, so that the core 11 is contacted by the table 41 within the case 3, and secured to the upper face 41a of the table 41 due to the forces of the magnet 43 fixed to the upper face 41a of the table 41 which attracts the magnetic member 12 secured to the core 11, and the disk locking member 15 which acts in reaction to hold disk 4 in place.

As the disk 4 is secured to the table 41 as mentioned above, the top face 13a of the annular rib 13 of the core 11, which is pushed up by the table 41, first pushes up the second elastic member 17, which has the lower spring constant, in a direction of arrow g, and then pushes up the first elastic member 16, which has the higher spring constant, in the direction of arrow g, so that the low friction member 39 is pressed against the projection 38. Both sides of the central portion, where the low friction member 39 is attached, of the first elastic member 16 are deflected in the direction of arrow h and the elastic force of th member 16 generates forces in the direction of arrow i. Thus, the core 11 is elastically pressed against the upper face 41a of the table 41 by the elastic forces of the first and second elastic members 16 and 17, and is secured to the table 41. After the core 11 is secured as mentioned above, the core 11 is held on the table 41 by the attractive force of the magnet 43.

Figure 2C:
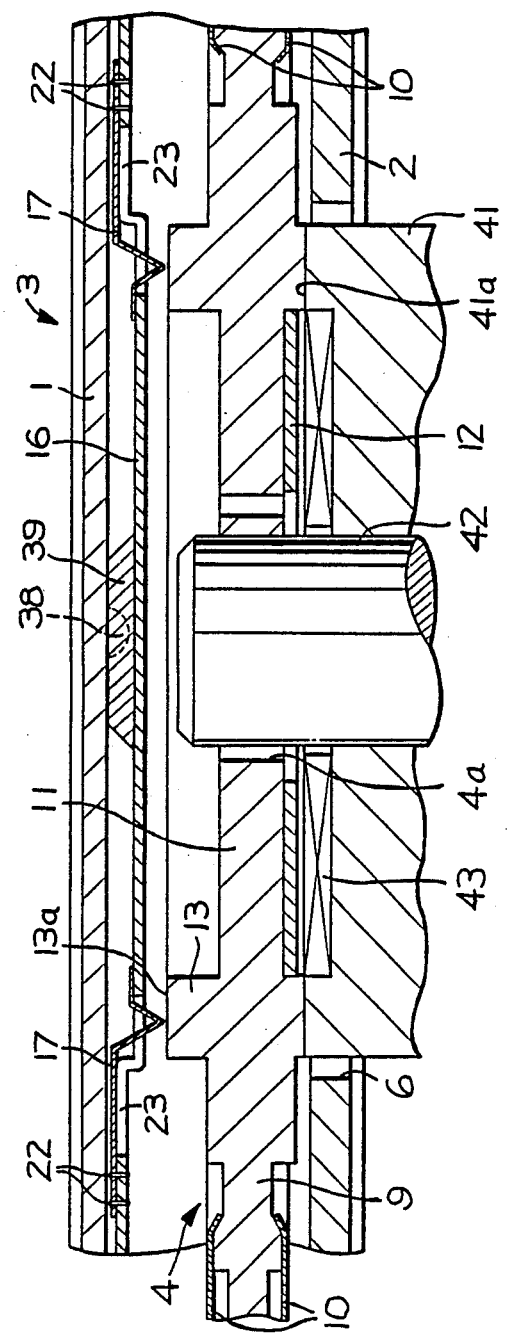
Figure 3C:
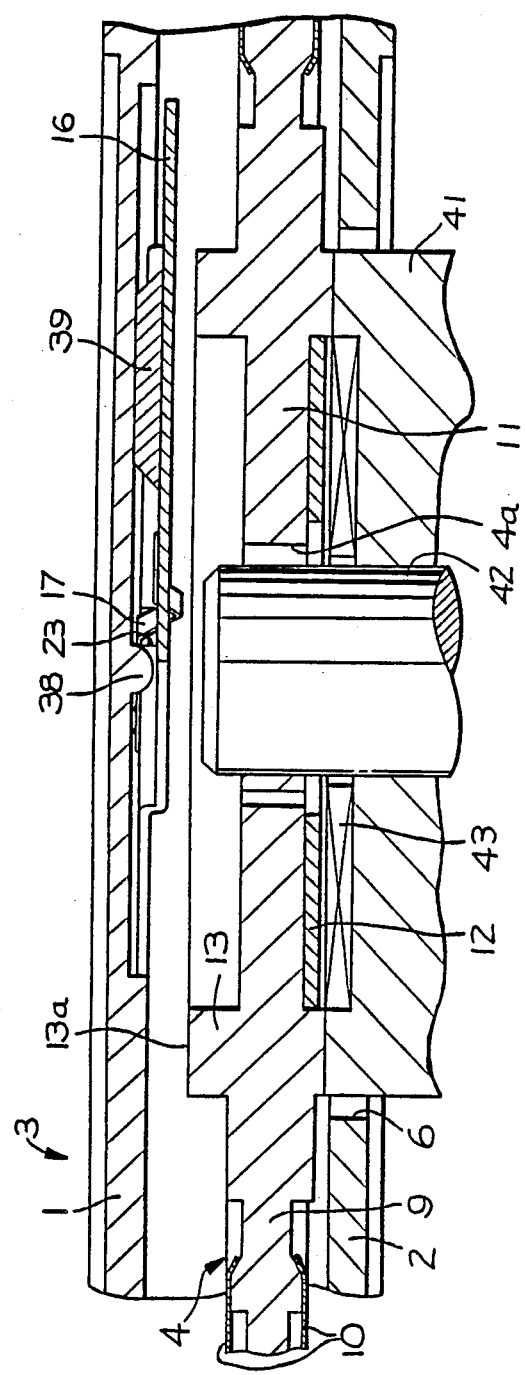

When the disk 4 is secured to the table 41, an unlocking pin 45 is inserted from underneath into the pin insertion notch 31 through the pin insertion hole 30 as shown in FIGS. 1A and 5A. The slider 19 is then moved in the direction of arrow d by the unlocking pin 45, so that the disk locking member 15 is moved from the restraint position $P_1$ to the release position $P_2$ in the direction of arrow d against the force of the torsion spring 27. As a result, the second elastic members 17 are raised from the position near the top face 13a of the annular rib 13 to an oblique upper position in the direction of arrow d, so that the disk 4 is unlocked as shown in FIGS. 2C and 3C.

That is, while the sliders 18 and 19 are moved from the positions shown in FIGS. 4A and 5A to the forward positions shown in FIGS. 4B and 5B in the direction of arrow d, the low friction member 39 is first disengaged from the projection 38 in the direction of arrow d, and then the sliders 18 and 19 slide up on the inclined surfaces 35a and 35b of the guides 35 and 36, so that the first elastic member 16 is raised in the oblique direction from the restraint position $P_1$ to the release position $P_2$, and thereby, the first and second elastic members 16 and 17 are separated from the top face 13a of the annular rib 13 to unlock the disk 4.

After being unlocked, the disk 4 is rotated at high speed by the table 41 so as to perform recording or reproducing without contact between the disk 4 and either the case 3 or the disk locking member 15.

Figure 6:
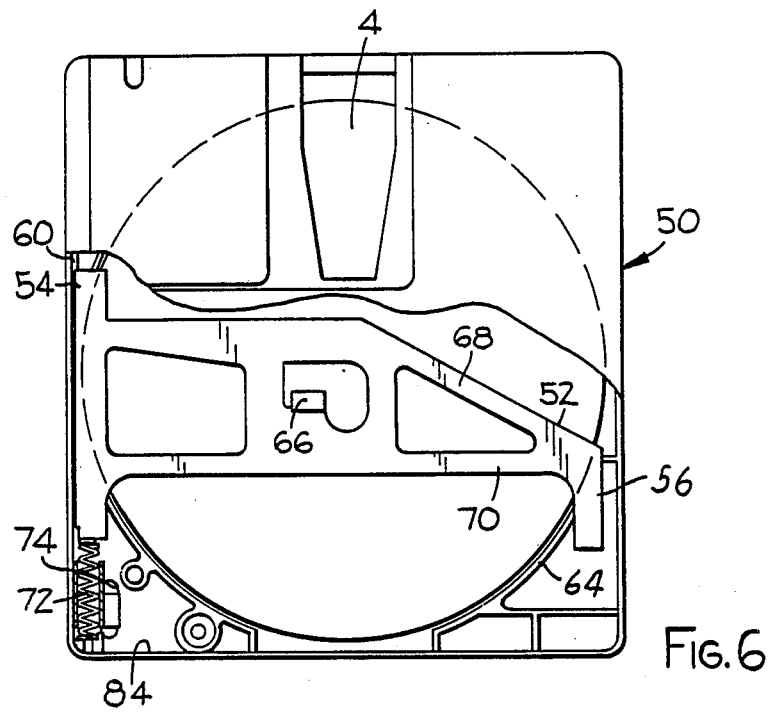
FIG. 6 is a plan view of the cartridge, partially in cross-section, illustrating an alternate embodiment of the restraint of the invention.
Figure 7:
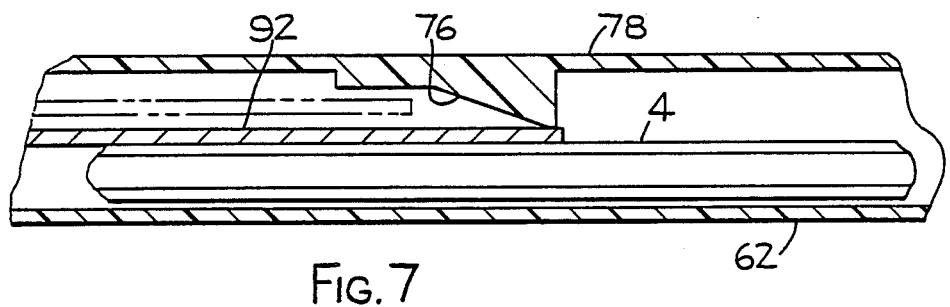
FIG. 7 is a partial, cross-sectional, elevational view of yet another embodiment of the present invention.
Figure 8:
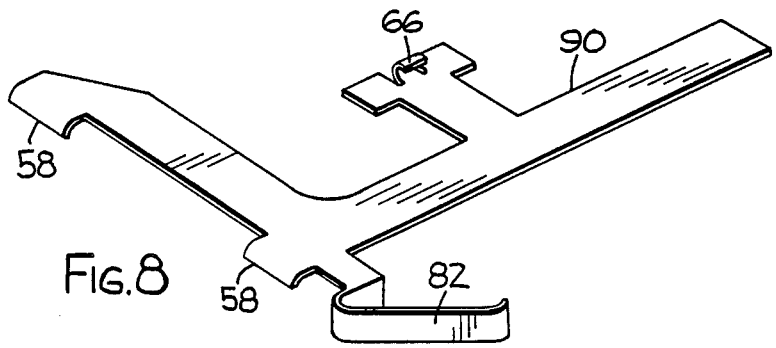
FIG. 8 is a perspective view of still another embodiment of the restraint of the present invention. cl DESCRIPTION OF THE PREFERRED EMBODIMENT Referring to the accompanying drawings, an embodiment of the disk cartridge according to the present invention will now be described.

FIGS. 6, 7 and 8 illustrate alternate embodiments of the disk restraint 15 which include features that may be combined in a number of different ways. FIG. 6 depicts a cartridge 50 which includes a restraint 52 having a guide edge 54 and a free end 56. The restraint 52 is preferably formed of stamped metal, such as stainless steel, but alternatively may be molded of a synthetic resin. The guide edge 54 includes two downturned tabs which are identical to the downturned edges 58 illustrated in conjunction with the embodiment of a restraint 90 shown in FIG. 8. The downturned edges 58 of the restraint 52 slide within a groove 60 molded into the lower half 62 of the cartridge 50. The free end of the restraint 52 is supported for sliding motion by an upstanding rib 64 likewise molded as a part of the lower cartridge half 62. The restraint 52 also includes an upturned tab 66, best illustrated by and identical to, the tab 66 of FIG. 8.

The tab 66 is supported by cross-arms 68 and 70 for movement with the guide edge 54. The restraint is biased toward the forward edge of the cartridge 50 by a coil spring 72, and may be retracted in the direction opposite to the bias of the spring 72 by the unlocking pin 45 of the disk drive which operates through a slotted hole 74 as described with respect to the embodiment of FIGS. 1A–5B. In response to the bias of the spring 72, the restraint is forced toward the forward edge of the cartridge 50 to bring the upturned tab 66 into contact with a camming surface 76 molded as a portion of the upper cartridge half 78, as shown in FIG. 7. Contact between the tab 66 and the camming surface 76 causes the central portion of the restraint to be forced downwardly into contact with the disk 4. In this manner, the disk 4 is maintained in contact with the lower half 62 of the cartridge 50 and prevented from moving within the cartridge 50.

Operation of the unlocking pin 45, as described above with respect to the embodiments of FIGS. 1A–5B, retracts the restraint against the force of the spring 72 and allows the tab 66 to ride up the camming surface 76 due to resiliency of the restraint 52 and free the disk 4 for rotation.

FIG. 8 illustrates yet another embodiment of a restraint 90 which is different from the embodiment of FIG. 6 in that one of the cross-arms 68 is eliminated and an integral spring 82 is substituted for the coil spring 72. The integral spring 82 reacts against a wall 82 of the cartridge 50 to force the restraint in the same direction as the coil spring 72. In all respects the restraint 90 operates identically to the restraint 52 to force the disk 4 into contact with the cartridge 50 and prevent movement of the disk 4 within the cartridge when the cartridge is not in use.

FIG. 7 simply illustrates that the upturned tab 66 of the restraint 52 or 90 may be eliminated if so desired. The restraint 92 of FIG. 7 is flat in the area of the camming surface 76 and moves as illustrated in FIG. 7 between a restraint position shown in solid lines and a retracted position shown in phantom. While the restraint 92 is somewhat cheaper to fabricate, it does present some disadvantages. The provision of the upturned tab 66 is desirable to reduce friction between the restraint and the camming surface 76, and elimination of the tab 66 requires that the camming surface extend further toward the disk 4 than is required if the tab 66 is provided. The restraint may represent a cost savings, however, if sufficient clearance between the disk 4 and the camming surface can be maintained during operation.

Having described an illustrative embodiment of this invention with reference to the accompanying drawings, it is to be understood that the invention is not limited to that precise embodiment, and that various changes and modifications may be effected within the scope of this invention.

For example, the disk cartridge of this invention may accommodate any kind of disk-like recording medium, such as magnetic, optical or optoelectronic recording medium.

I claim:

1. A cartridge for a disc having at least one magnetic surface comprising:
    a top wall generally parallel to the plane of said disc;
    a bottom wall generally parallel to said top wall and said plane of said disc;
    side walls connecting said top and said bottom walls to form an enclosure surrounding said disc;
    a camming surface extending from the surface of said top wall facing said disc toward said disc; and
    a resilient restraint spanning said disc and supported beyond the extent of said disc and slideable within said cartridge between a first position wherein a portion of said restraint engages said camming surface to be forced toward said disc and capture said disc between said restraint and said bottom wall and a second position wherein said restraint is free of contact with said camming surface and resiliently retracts out of contact with said disc.

2. A cartridge for a disc according to claim 1 further including means for biasing said restraint toward said first position.

3. A cartridge for a disc according to claim 1 wherein said restraint includes an upturned tab extending toward said top wall for engagement with said camming surface so that the extension of said camming surface from said top wall surface may be reduced without reducing the distance said restraint moves toward said disc when in said first position.

4. A cartridge for a disc according to claim 1 wherein said restraint further includes a down-turned edge adjacent an edge of said disc and said cartridge further includes a groove accepting said down-turned edge for guidance of said restraint in its movements between said first position and said second position.

5. A cartridge for a disc according to claim 1 wherein said cartridge further includes internal walls supporting said restraint adjacent opposite sides of said disc.

6. A cartridge for a disc according to claim 1 wherein said means for biasing said restraint is a spring integrally formed with said restraint as a resilient extension of said restraint which is deformed as said restraint moves from said first to said second position.

7. A cartridge for a stretched-surface recording disc comprising:
    a housing enclosing said disc and including planar top and bottom walls both generally parallel to the plane of said disc and side walls interconnecting said top and bottom walls;
    a camming surface within said housing and extending from said top wall toward said disc;
    a restraint located within said housing and having a generally planar portion disposed between said disc and said top wall and movable into engagement with said camming surface so that said engagement forces said planar portion into contact with said disc and in turn forces said disc into contact with said bottom wall to restrict movement of said disc when said restraint is in contact with said camming surface.

8. A cartridge according to claim 7 wherein said housing further includes a groove adjacent one of said side walls and said restraint includes a turned end extending into said groove for guidance of said restraint during movement of said restraint.

9. A cartridge according to claim 7 wherein said disc includes a central hub extending axially beyond the limits of said disc for contact with said restraint and said bottom wall when said restraint is in engagement with said camming surface.

10. A cartridge for a disc according to claim 7 wherein said restraint includes a projection extending toward said top wall for engagement with said camming surface so that the extension of said camming surface from said top wall surface may be reduced without reducing the distance said restraint moves toward said disc when said projection is in engagement with said camming surface.

11. A cartridge for a disc according to claim 7 wherein said cartridge further includes internal walls supporting said restraint adjacent opposite sides of said disc.

12. A cartridge for a disc according to claim 7 further including means for biasing said restraint toward said first position.

13. A cartridge for a disc according to claim 12 wherein said means for biasing said restraint is a spring integrally formed with said restraint as a resilient extension of said restraint which is deformed as said restraint moves away from said camming surface.

* * * * *